United States Patent
Hung et al.

(10) Patent No.: US 7,864,499 B2
(45) Date of Patent: Jan. 4, 2011

(54) SWITCHING POWER SUPPLY SAVING SYSTEM

(75) Inventors: Jui-Ting Hung, Taipei Hsien (TW); Fang-Ta Tai, Taipei Hsien (TW)

(73) Assignee: Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 445 days.

(21) Appl. No.: 12/138,652

(22) Filed: Jun. 13, 2008

(65) Prior Publication Data
US 2009/0230781 A1    Sep. 17, 2009

(30) Foreign Application Priority Data
Mar. 12, 2008    (CN)    .......................... 2008 1 0300543

(51) Int. Cl.
*H02H 47/00*    (2006.01)
(52) U.S. Cl. ...................................... 361/139
(58) Field of Classification Search ................ 361/139
See application file for complete search history.

(56) References Cited

U.S. PATENT DOCUMENTS

| | | | |
|---|---|---|---|
| 4,350,337 A * | 9/1982 | Knauer et al. | 473/66 |
| 5,812,386 A * | 9/1998 | Youn | 363/86 |
| 7,523,328 B2 * | 4/2009 | Seo | 713/320 |

* cited by examiner

*Primary Examiner*—Stephen W Jackson
(74) *Attorney, Agent, or Firm*—D. Austin Bonderer

(57) ABSTRACT

A switching power supply saving system includes a power interface, a power converting circuit, a relay, a relay driving circuit, a trigger, and a timing sequence circuit. The power converting circuit is configured to receive the AC power from the power interface. The power converting circuit is capable of transforming the AC power to direct current (DC) power to supply to a motherboard. When the timing sequence circuit receives a power on signal, the timing sequence circuit is capable of controlling the relay driving circuit via the trigger to cause the relay to connect the power converting circuit to the power interface. When the timing sequence circuit receives a power off signal, the timing sequence circuit is capable of controlling the relay driving circuit via the trigger to cause the relay to cut off connection between the power converting circuit and the power interface.

14 Claims, 2 Drawing Sheets

SWITCHING POWER SUPPLY SAVING SYSTEM

BACKGROUND

1. Field of the Invention

The present invention relates to switching power supplies having a power-saving function.

2. Description of related art

Nowadays, switching power supplies are widely used in computer products. When a computer is turned off via software thereof, the conventional switching power supply in the computer still outputs a 5V standby voltage to a motherboard of the computer for turning on the computer quickly the next time. However, if the computer is not used for a long time, the 5V standby voltage is wasted.

What is needed is to provide a switching power supply which can save electricity after a computer is turned off via software thereof.

SUMMARY

An embodiment of a switching power supply saving system includes a power interface, a power converting circuit, a relay, a relay driving circuit, a trigger, an AC-DC converter, and a timing sequence circuit. The power interface is configured to receive an external alternating current (AC) power. The power converting circuit is configured to receive the AC power from the power interface. The power converting circuit is capable of transforming the AC power to direct current (DC) power to supply power to a motherboard. The relay includes a relay switch. The relay switch is connected between the power interface and the power converting circuit. The relay driving circuit is configured to drive the relay. The trigger is configured to trigger the relay driving circuit. The AC-DC converter is configured to receive the AC power from the power interface. The AC-DC converter is capable of transforming the AC power to DC power to supply power to the relay, the relay driving circuit, and the trigger. When the timing sequence circuit receives a power on signal, the timing sequence circuit is capable of controlling the relay driving circuit via the trigger to cause the relay to connect the power converting circuit to the power interface. When the timing sequence circuit receives a power off signal, the timing sequence circuit is capable of controlling the relay driving circuit via the trigger to cause the relay to cut off connection between the power converting circuit and the power interface.

Other advantages and novel features of the present invention will become more apparent from the following detailed description of an embodiment when taken in conjunction with the accompanying drawings, in which:

DETAILED DESCRIPTION

Figure 1:
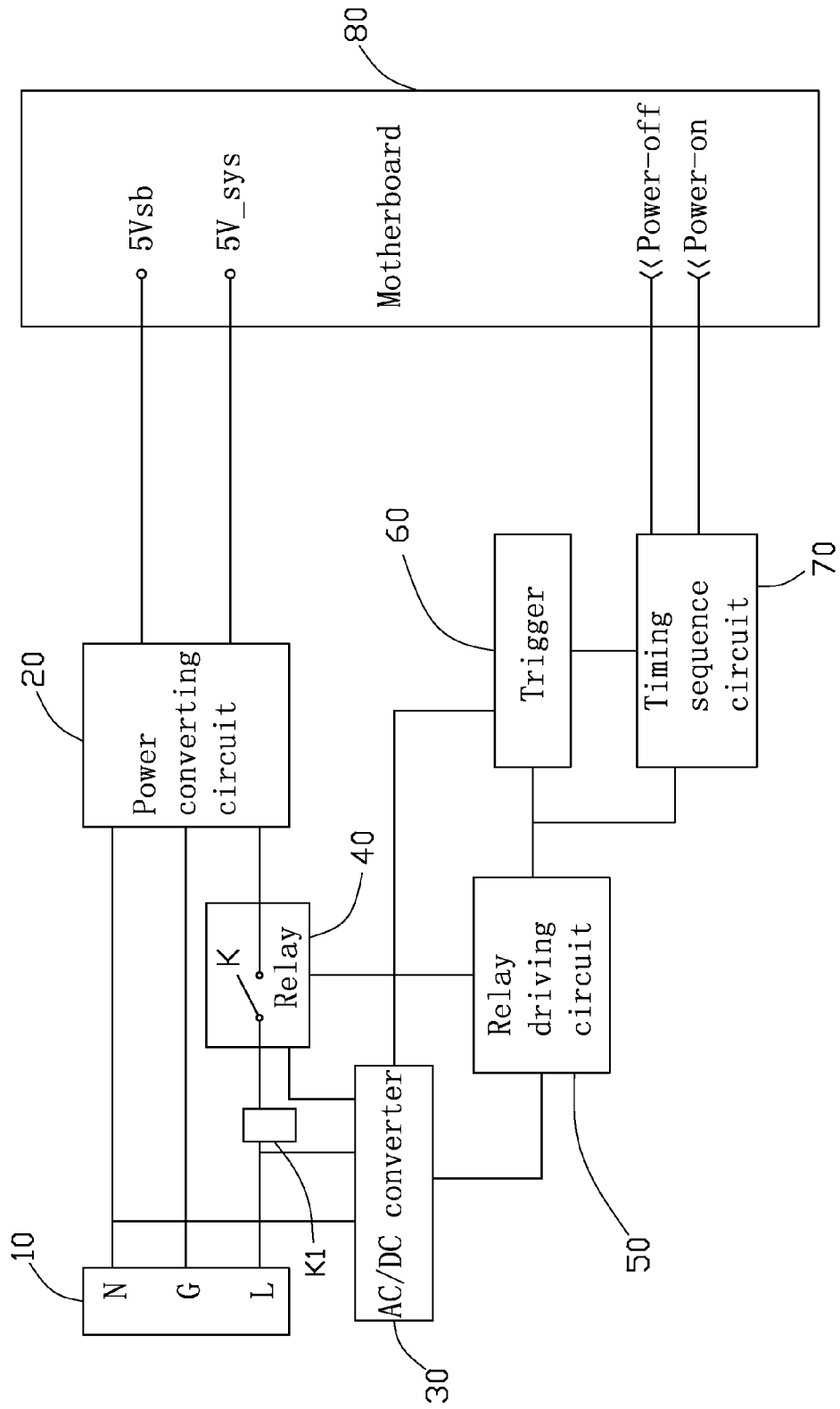
FIG. 1 is a block diagram of a switching power supply saving system in accordance with an embodiment of the present invention.
Figure 2:
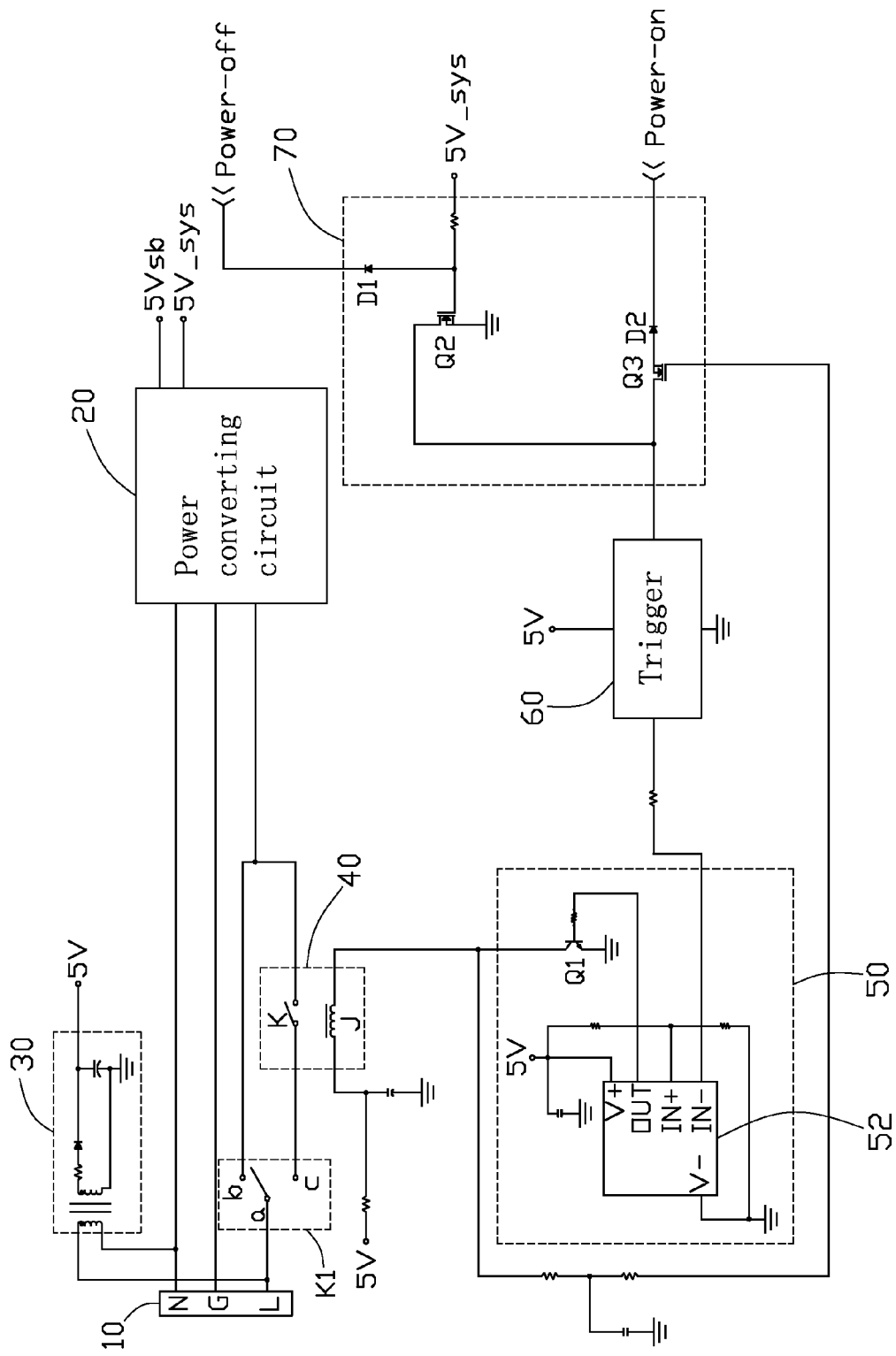
FIG. 2 is a circuit diagram of FIG. 1.

Referring to FIGS. 1 and 2, a switching power supply saving system in accordance with an embodiment of the present invention is configured to supply power to a motherboard 80 of a computer. The switching power supply saving system includes a power interface 10, a power converting circuit 20, an AC-DC converter 30, a relay 40 having a relay switch K and a relay coil J, a relay driving circuit 50, a trigger 60, and a timing sequence circuit 70.

The power interface 10 is configured to connect to an external alternating current (AC) power supply. A neutral line N and a ground line G of the power interface 10 are connected to two corresponding power terminals of the power converting circuit 20. A hot line L of the power interface 10 is connected to a corresponding power terminal of the power converting circuit 20 via a mode switch K1 and a relay switch K of the relay 40 in turn. The power converting circuit 20 receives AC power from the power interface 10 and transforms the AC power to direct current (DC) power to supply to the motherboard 80 as motherboard voltages, such as a 5V system voltage 5V_sys and a 5V standby voltage 5 Vsb.

The AC-DC converter 30 is configured to receive the AC power from the power interface 10 and transform the AC power to DC power, such as a 5V voltage, to supply to the relay 40, the relay driving circuit 50, and the trigger 60.

The relay driving circuit 50 includes a transistor Q1 and an LM358 comparator chip 52. The timing sequence circuit 70 includes two field-effect transistors (FETs) Q2 and Q3, and two diodes D1 and D2. In other embodiments, the diodes D1 and D2 can be deleted as a cost saving measure.

In this embodiment, the mode switch K1 is a single-pole double-throw (SPDT) mode switch having a switch pole 'a' and two switch throws 'b' and 'c'. The hot line L of the power interface 10 is connected to the switch pole 'a'. The switch throw 'b' is directly connected to the corresponding power terminal of the power converting circuit 20. The switch throw 'c' is connected to the corresponding power terminal of the power converting circuit 20 via the relay switch K. When the switch pole 'a' contacts the switch throw 'b', the switching power supply saving system will work in a normal mode. When the switch pole 'a' contacts the switch throw 'c', the switching power supply saving system will work in a power-saving mode.

A terminal of the relay coil J is connected to a 5V power supply from the AC-DC converter 30, the other terminal of the relay coil J is connected to a transistor collector of the transistor Q1 and an FET gate of the FET Q3. A transistor emitter of the transistor Q1 is grounded. A transistor base of the transistor Q1 is connected to a comparator chip output terminal OUT of the comparator chip 52. A comparator chip input terminal IN—of the comparator chip 52 is connected to drains of the FETs Q2 and Q3 via the trigger 60. An FET gate of the FET Q2 is connected to an anode of the diode D1 and a 5V system voltage terminal 5V_sys of the motherboard 80. An FET source of the FET Q2 is grounded. A cathode of the diode D1 is connected to a power off signal pin Power-off of the motherboard 80. An FET source of the FET Q3 is connected to an anode of the diode D2. A cathode of the diode D2 is connected to a power on signal pin Power-on of the motherboard 80.

While the switching power supply saving system is in the power-saving mode, if a power switch of the motherboard 80 is turned on, the Power-on signal pin sends a low voltage signal to the FET source of the FET Q3, thereby the FET Q3 is turned on. Then the trigger 60 controls the comparator chip 52 to be turned on, the transistor Q1 is turned on, and then the relay 40 is conductive, namely the relay switch K is turned on. Thereby the power converting circuit 20 supplies power to the motherboard 80.

If the motherboard 80 is turned off by users via software thereof, the Power-off signal pin sends a high voltage signal to the FET source of the FET Q2, thereby the FET Q2 is turned on. Then the trigger 60 controls the comparator chip 52 to be turned off, the transistor Q1 is turned off, and then the relay 40 is not conductive, namely the relay switch K is turned off. Thereby the power converting circuit 20 cannot supply power to the motherboard 80, and the 5V standby voltage is cut off from the motherboard 80, which saves electricity.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A switching power supply saving system, the system comprising:
    a power interface configured to receive an external alternating current (AC) power;
    a power converting circuit configured to receive the AC power from the power interface, the power converting circuit capable of transforming the AC power to direct current (DC) power to supply power to a motherboard;
    a relay comprising a relay switch, the relay switch connected between the power interface and the power converting circuit;
    a relay driving circuit configured to drive the relay;
    a trigger configured to trigger the relay driving circuit;
    an AC-DC converter configured to receive the AC power from the power interface, the AC-DC converter capable of transforming the AC power to DC power to supply power to the relay, the relay driving circuit, and the trigger; and
    a timing sequence circuit;
    wherein upon a condition that the timing sequence circuit receives a power on signal, the timing sequence circuit is capable of controlling the relay driving circuit via the trigger to cause the relay to connect the power converting circuit to the power interface; and
    upon a condition that the timing sequence circuit receives a power off signal, the timing sequence circuit is capable of controlling the relay driving circuit via the trigger to cause the relay to cut off connection between the power converting circuit and the power interface.

2. The system as claimed in claim 1, wherein the relay driving circuit comprises a transistor and a comparator chip; the relay switch is connected between a hot line of the power interface and the power converting circuit; a relay coil is connected to the DC power from the AC-DC converter and to a transistor collector; a transistor emitter is grounded, a transistor base is connected to a comparator chip output pin, and a comparator chip input pin is connected to the timing sequence circuit via the trigger.

3. The system as claimed in claim 2, wherein the timing sequence circuit comprises a first field-effect transistor (FET) and a second FET; the transistor collector is connected to a second FET gate, the trigger is connected to drains of the first and second FETs, a first FET gate is connected to a system voltage and a power off signal pin, a first FET source is grounded, a second FET source is connected to a power on signal pin.

4. The system as claimed in claim 3, further comprising a diode connected between the first FET gate and the power off signal pin.

5. The system as claimed in claim 3, further comprising a diode connected between the second FET source and the power on signal pin.

6. The system as claimed in claim 1, further comprising a single-pole double-throw (SPDT) mode switch comprising a switch pole, a first switch throw and a second switch throw; wherein a hot line of the power interface is connected to the switch pole; the first switch throw is connected to the a first power terminal of the power converting circuit; the second switch throw is connected to a second power terminal of the power converting circuit via the relay switch.

7. A switching power supply saving system for a computer, the system comprising:
    a power interface configured for receiving an external alternating current (AC) power;
    a power converting circuit configured for receiving the AC power from the power interface, the power converting capable of transforming the AC power supply to direct current (DC) power to supply to a motherboard;
    a switch circuit connected between the power interface and the power converting circuit; and
    a control circuit connected to the motherboard;
    wherein upon a condition that the control circuit receives a power on signal from the motherboard, the control circuit is capable of controlling the switch circuit to connect the power converting circuit to the power interface;
    upon a condition that the control circuit receives a power off signal from the motherboard, the control circuit is capable of controlling the switch circuit to cut off connection between the power converting circuit and the power interface.

8. The system as claimed in claim 7, wherein the switch circuit comprises a relay; the relay comprises a relay switch and a relay coil; the relay switch is connected between the power interface and the power converting circuit; the relay coil is controlled by the control circuit.

9. A method for saving power for a motherboard, the method comprising of: providing:
    a power interface configured to receive an external alternating current (AC) power;
    a power converting circuit that receives the AC power from the power interface, the power converting circuit that transforms the AC power to direct current (DC) power to supply power to a motherboard;
    a relay comprising a relay switch, the relay switch connected between the power interface and the power converting circuit;
    a relay driving circuit that drives the relay;
    a trigger that triggers the relay driving circuit;
    an AC-DC converter that receives the AC power from the power interface, the AC-DC converter capable of transforming the AC power to DC power to supply power to the relay, the relay driving circuit, and the trigger; and
    a timing sequence circuit;
    upon a condition that the timing sequence circuit receives a power on signal from the motherboard, the timing sequence circuit controls the relay driving circuit via the trigger to cause the relay to connect the power converting circuit to the power interface; and
    upon a condition that the timing sequence circuit receives a power off signal from the motherboard, the timing sequence circuit controls the relay driving circuit via the trigger to cause the relay to cut off connection between the power converting circuit and the power interface.

10. The method as claimed in claim 9, wherein the relay driving circuit comprises a transistor and a comparator chip; the relay switch is connected between a hot line of the power interface and the power converting circuit; a relay coil is connected to the DC power from the AC-DC converter and to a transistor collector, a transistor emitter is grounded, a transistor base is connected to a comparator chip output pin, a comparator chip input pin is connected to the timing sequence circuit via the trigger.

11. The method as claimed in claim 10, wherein the timing sequence circuit comprises a first field-effect transistor (FET) and a second FET; the transistor collector is connected to a second FET gate, the trigger is connected to drains of the first and second FETs, a first FET gate is connected to a system voltage and a power off signal pin of the motherboard, a first FET source is grounded, a second FET source is connected to a power on signal pin of the motherboard.

12. The method as claimed in claim 11, further providing a diode connected between the first FET gate and the power off signal pin of the motherboard.

13. The method as claimed in claim 11, further providing a diode connected between the second FET source and the power on signal pin of the motherboard.

14. The method as claimed in claim 9, further providing a single-pole double-throw (SPDT) mode switch comprising a switch pole, a first switch throw and a second switch throw; wherein a hot line of the power interface is connected to the switch pole;

the first switch throw is connected to a first power terminal of the power converting circuit; the second switch throw is connected to a second power terminal of the power converting circuit via the relay switch.

\* \* \* \* \*